United States Patent Office 3,227,707
Patented Jan. 4, 1966

3,227,707
STANNOUS CHELATES OF POLYHYDROXY COMPOUNDS
Horst G. Langer, Cochituate, Mass., assignor to The Dow Chemical Company, Midland, Mich., a corporation of Delaware
No Drawing. Filed May 25, 1962, Ser. No. 197,597
8 Claims. (Cl. 260—209)

This invention is concerned with the preparation of a class of new compounds which may be broadly defined as stannous chelates of certain organic hydroxy compounds. More particularly the invention is concerned with the preparation of this new class of stannous chelates which, in recognition of the fact that the stannous ion is useful in compositions for the prevention of dental caries, make it possible to prepare stable compositions containing the stannous ions, in an organic medium, without the presence of common anions, such as the fluoride, phosphate, sulfate, chloride and the like. The compounds of the stannous ion thus prepared, namely, these organic chelates of the stannous ion, are of particular value in the preparation of toothpastes, tooth powders and other compositions used in oral hygiene.

Stannous fluoride is a rather widely accepted component of toothpaste and oral hygiene products, based upon the observation that it is useful to prevent the development of dental caries. Generally it is incorporated in toothpaste as the fluoride. Such compositions have the disadvantage that the cleansing agent or composition itself is approximately neutral, or even slightly alkaline. In such a composition the stannous fluoride ionizes and the resulting tinny taste of the product is most difficult to disguise. Similarly, certain levels of toxicity and instability are encountered with these stannous compounds.

Accordingly, it is the fundamental object of this invention to prepare stannous compounds chelated with organic compounds of a carbohydrate or sugar type, wherein the chelation of the stannous ion is across spaced hydroxyl groups of the organic compound.

Thus, the invention is based upon the formation of stannous chelates of compounds, such as ethylene glycol, glycerine, sorbitol, glucose, dextrose, sucrose, and the like, wherein the formation of the chelate is based upon a 2, 3, 4, 5 or 6 carbon atom structure, characterized further by the presence of a plurality of hydroxyl groups, preferably on adjacent carbon atoms thereby making possible chelation with the tin in a 5 member ring. Specifically the invention, therefore, is concerned with the stannous chelates of this family of compounds, as well as the method involving their preparation, wherein the method consists of the steps, combinations and sequence of steps hereinafter to be set forth in greater detail.

The formula for the compounds constituting the invention in this case may be generally stated, substantially as follows:

SnX wherein the X is a bi-valent organic radical obtained from an organic compound having 2–6 carbon atoms, in a chain, having at least two hydroxyl groups on carbon atoms, preferably adjacent to each other, in a polyhydroxy or carbohydrate structure. Typical organic compounds useful for the purpose are glycol, glycerol, sorbitol, glucose, sucrose, dextrose, and other polyhydroxy compounds having 2, 3, 4, 5 or 6 carbon atoms in this polyhydroxy or carbohydrate structure. Glycosides or polymers of these compounds are useful for the purpose. The invention will be better understood by reference to the specific examples herein where the method of preparation is clearly illustrated.

Example 1

Distannous EDTA ($SnII_2EDTA \cdot 2H_2O$) is dissolved in hot ethylene glycol. The amount of ethylene glycol is not critical. However, it should be enough to allow complete solution of the stannous chelate. Upon cooling, crystals of the stannous chelate of glycol precipitate and are filtered off and washed with alcohol. Distannous EDTA is used as a starting material in order to avoid any interference or contamination from any other anion such as chloride, sulfate, etc.

Example 2

In the preparation of the stannous chelate of glycerol the same procedure as in Example 1 is followed. The amount of distannous EDTA and glycerol is not critical so that the end chelate is directly formed.

In the preparation of the compound it is desirable to commence with a stannous compound having an essentially innocuous anion. The fluorides, chlorides, etc. can be used, but inasmuch as the purpose of preparation is to produce an end compound basically free of these, it is preferable to commence with the stannous chelate as indicated in Example 1.

The structure of the compound formed appears to be in a ring form involving two of the hydroxyl groups of the compounds, i.e., two of the adjacent hydroxyl groups. The hydrogen atoms in the hydroxyl groups are sufficiently labile to separate and permit this reaction with the active ion such as the stannous tin. The result is this stable chelate compound, which is separable, completely free of any contamination of the anion, therefore, providing tin in form which is useful in the preparation of oral products.

The reaction must be carried out in the liquid phase, and in a temperature range preferably high enough to give a reaction, generally about 50°–100° C. and higher. An additional solvent can be used to carry out the reaction. Temperature and pressure however are not critical. An excess of the polyhydroxy compound is desirable and for more complex compounds the ratio of reactants may determine the identity of the chelate formed.

The compounds thus prepared all are generally white amorphous solids, which separate readily from the solution or from the medium in which they are formed.

As indicated the principal usefulness of these chelate compounds is for their incorporation into dental and oral hygiene products. It appears that they lower the solubility of dental enamel when they are applied topically.

In other systems where an oxygen scavenger is needed in the form of a readily oxidizable material, these compounds can be adopted.

As an alternative method for the preparation of these compounds in pure form, it is possible to commence with distannous tin chelate of EDTA. This provision is shown as follows in the following example.

Example 3

Distannous tin chelate of EDTA is reacted in concentrated solution with sorbitol at a temperature of 100° C. When solution is complete and the material allowed to cool, the white tin chelate of the sorbitol is separated. By keeping the amount of sorbitol down to about a half of the molar quantity of the distannous chelate used, reaction occurs between a single tin ion and a single sorbitol ion. In this manner the sorbitol or organic chelate is separated from the solution without leaving a residue of unreacted anion with the compound.

What is claimed is:

1. A compound corresponding to the following formula

SnX wherein the tin is bivalent and the anion X is an alkyl polyol moiety containing from 2 to about 6 carbon atoms per unit, said compound also having at least two hydroxyl groups in the structure wherein the hydrogen is labile enough to form a ring with the tin.

2. The tin II chelate of ethylene glycol.
3. The tin II chelate of glycerol.
4. The tin II chelate of sorbitol.
5. The tin II chelate of dextrose.
6. The tin II chelate of sucrose.
7. The method of forming a stannous chelate of a polyhydroxy alkylol compound having from about 2 to about 6 carbon atoms in its structure comprising, reacting a distannous amino acid chelate with polyhydroxy compound at a temperature in the range from about 50 to 100° C. to form a solution, allowing said solution to cool to room temperature and separating therefrom the stannous-polyol chelate as a precipitate.

8. The method in accordance with claim 7 in which the stannous chelate reactant is the di stannous chelate of ethylenediaminetetraacetic acid.

References Cited by the Examiner
UNITED STATES PATENTS

| | | | |
|---|---|---|---|
| 2,215,429 | 9/1940 | Schmidt et al. | 260—429.7 XR |
| 3,074,927 | 1/1963 | Saltman et al. | 260—209 |
| 3,115,509 | 12/1963 | Mack | 260—429.7 |

OTHER REFERENCES

Bourne et al.: "Chemistry & Industry," August 1, 1959, pages 998–999.

Courtney: "Jour. Amer. Chem. Soc.," vol. 80, pages 2121–8 (1958).

LEWIS GOTTS, *Primary Examiner.*

CHARLES B. PARKER, *Examiner.*